(12) United States Patent
Haigh et al.

(10) Patent No.: US 6,951,184 B2
(45) Date of Patent: Oct. 4, 2005

(54) CROSSING CONTROL ARM ASSEMBLY

(75) Inventors: James A. Haigh, Shelby Township, MI (US); Richard J. Iminski, St. Clair Shores, MI (US); Kevin L. Wolf, Jr., Macomb Township, MI (US)

(73) Assignee: Transpec, Inc., Sterling Heights, MI (US)

( * ) Notice: Subject to any disclaimer, the term of this patent is extended or adjusted under 35 U.S.C. 154(b) by 67 days.

(21) Appl. No.: 10/649,032

(22) Filed: Aug. 27, 2003

(65) Prior Publication Data

US 2004/0139907 A1 Jul. 22, 2004

Related U.S. Application Data

(60) Provisional application No. 60/440,583, filed on Jan. 16, 2003, and provisional application No. 60/406,452, filed on Aug. 28, 2002.

(51) Int. Cl.[7] .............................................. B60Q 11/00
(52) U.S. Cl. ...................... 116/28 R; 116/52; 293/117; 40/591; 280/763.1
(58) Field of Search ............................ 116/28 R, 35 R, 116/51–53, 63 P, 63 R; 40/591, 643; 280/763.1, 762, 764.1, 432

(56) References Cited

U.S. PATENT DOCUMENTS

| | | | |
|---|---|---|---|
| 3,675,785 A | * | 7/1972 | Martin ..................... 211/119.1 |
| 3,788,268 A | * | 1/1974 | Hiatt et al. ................ 116/28 R |
| 3,998,285 A | * | 12/1976 | Cooper ........................ 280/762 |
| 4,734,955 A | * | 4/1988 | Connor ......................... 16/332 |
| 5,199,754 A | | 4/1993 | Freeman |
| 5,357,239 A | | 10/1994 | Lamparter |
| 5,719,553 A | | 2/1998 | Lamparter |
| 5,860,385 A | | 1/1999 | Lamparter |
| 6,213,526 B1 | | 4/2001 | Swanger et al. |
| 6,234,105 B1 | | 5/2001 | Lamparter |
| 6,254,151 B1 | | 7/2001 | Lamparter |
| 6,435,075 B1 | | 8/2002 | Lamparter et al. |
| 6,477,978 B2 | | 11/2002 | Lamparter |
| 6,652,182 B1 | * | 11/2003 | Ellefson ......................... 404/9 |
| 2003/0089011 A1 | | 5/2003 | Haigh et al. |

* cited by examiner

*Primary Examiner*—Christopher W. Fulton
*Assistant Examiner*—Tania Courson
(74) *Attorney, Agent, or Firm*—Reising, Ethington, Barnes, Kisselle, P.C.

(57) ABSTRACT

A school bus has a front bumper equipped with a crossing control arm assembly. The assembly includes an actuator that is attached behind the bumper and a control arm that is moved by the actuator from a stored position atop the bumper to a deployed position generally perpendicular to the bumper. The control arm is attached to the actuator by a hinge bracket that includes a cross-over link that extends across the top of the bumper.

34 Claims, 8 Drawing Sheets

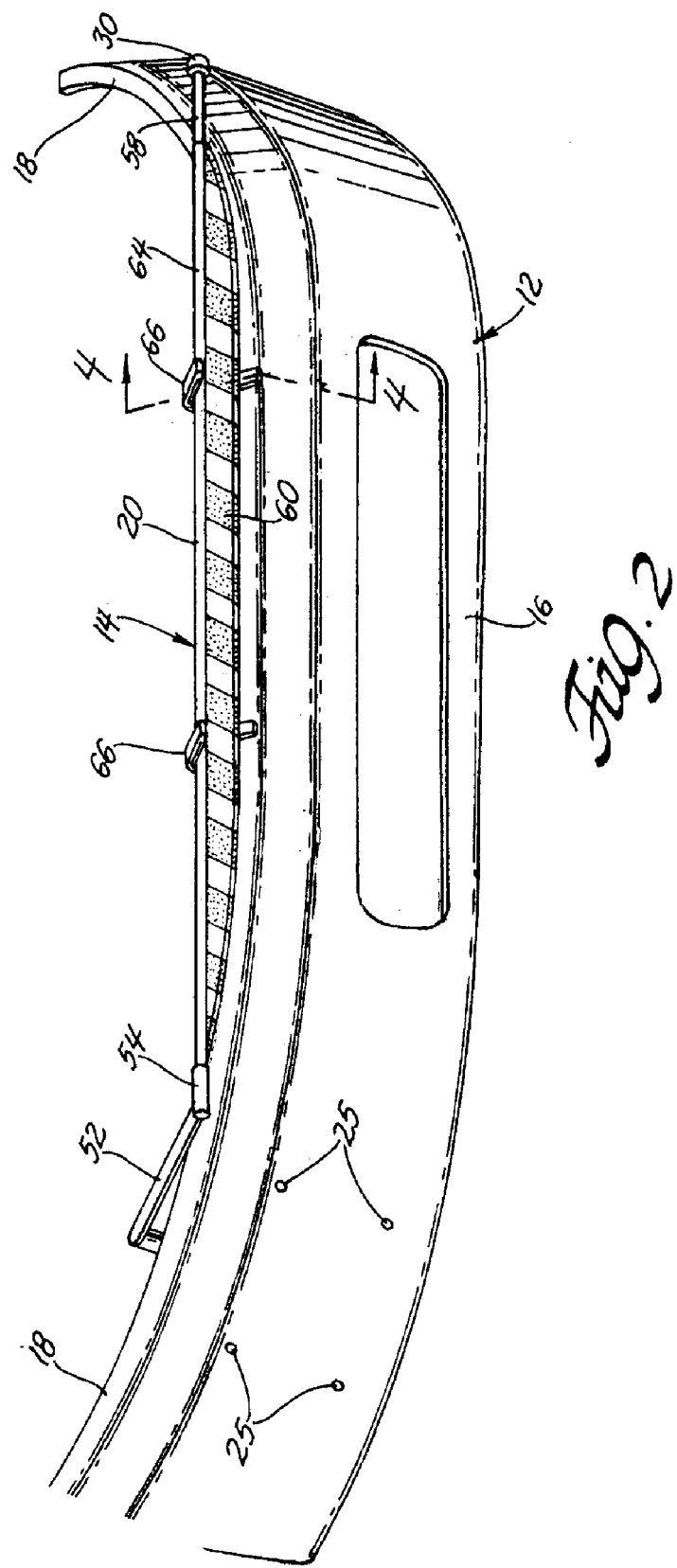

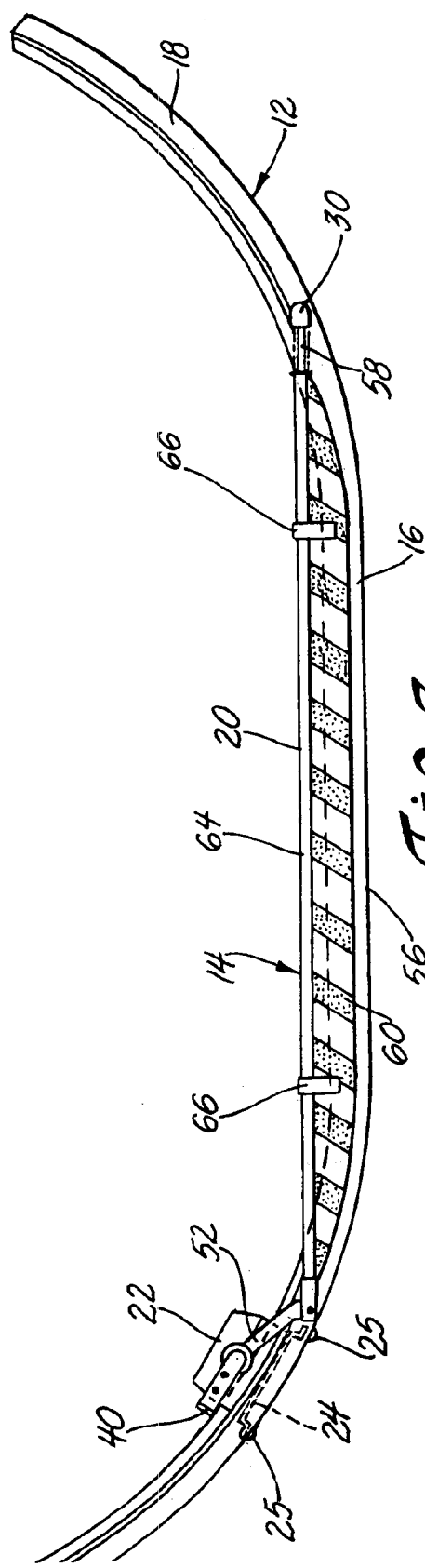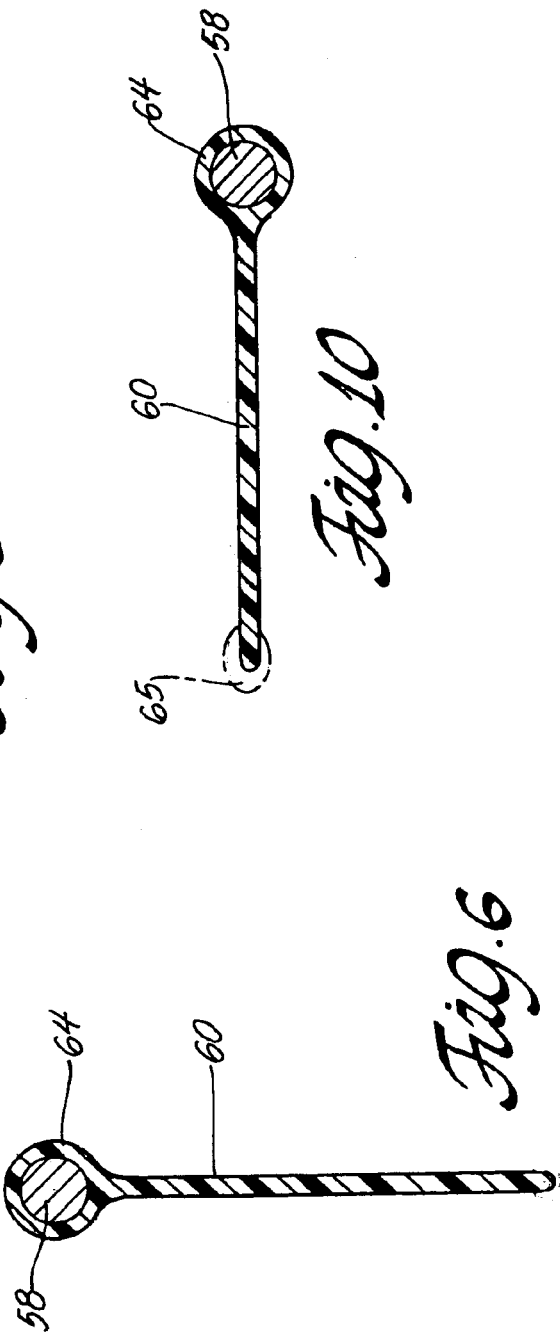

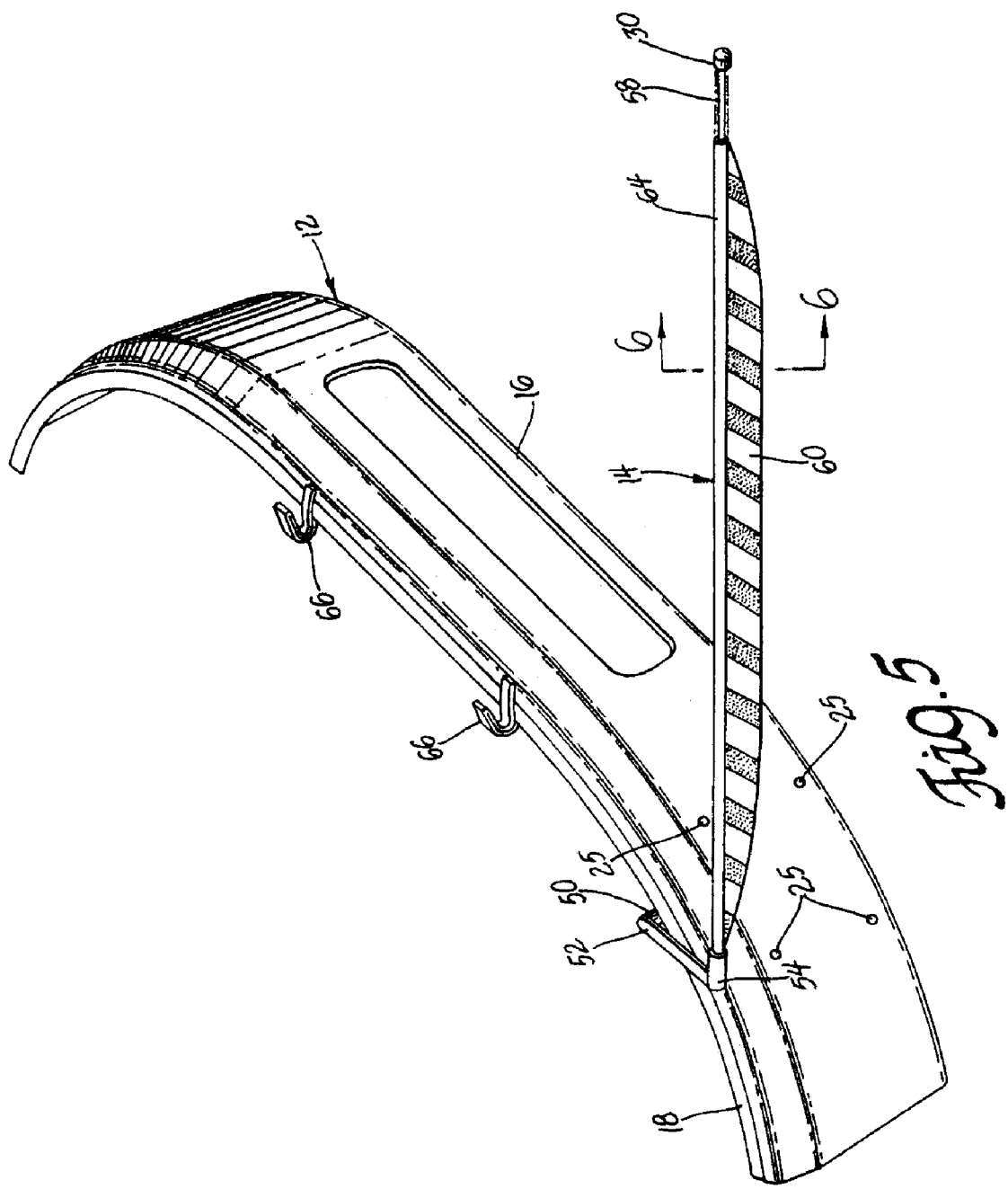

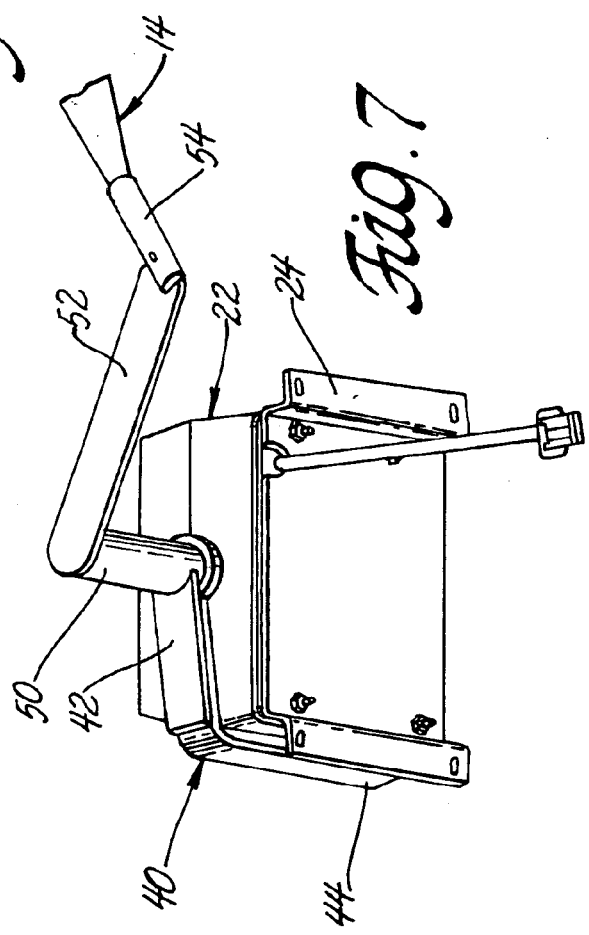

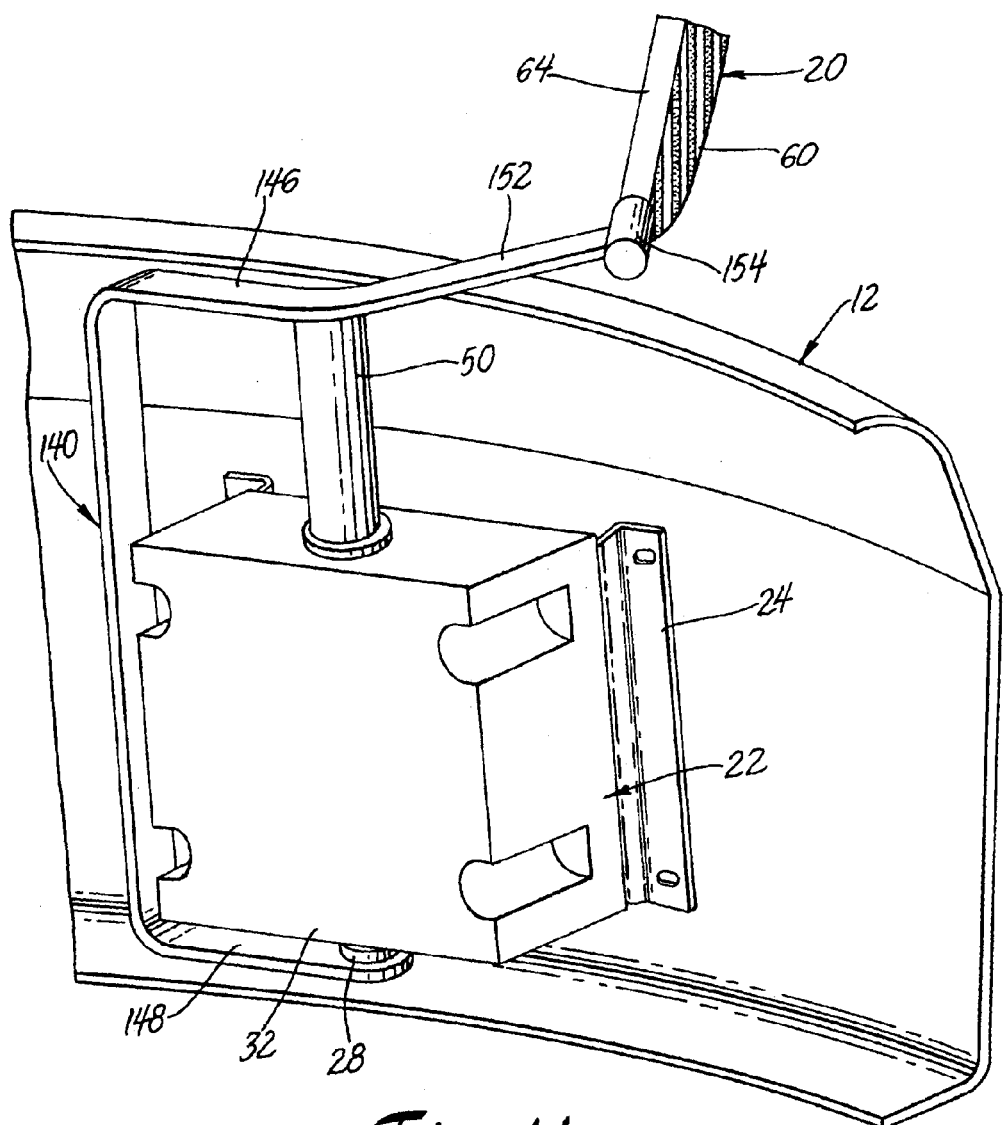

US 6,951,184 B2

CROSSING CONTROL ARM ASSEMBLY

RELATED PATENT APPLICATIONS

This application claims priority of U.S. Provisional Application No. 60/440,583 filed Jan. 16, 2003 and U.S. Provisional Application No. 60/406,452 filed Aug. 28, 2002.

FIELD OF THE INVENTION

This invention relates generally to a crossing control arm assembly and more particularly to a crossing control arm assembly for combination with a school bus front bumper.

BACKGROUND OF THE INVENTION

U.S. Pat. No. 6,234,105 granted to Ronald C. Lamparter May 22, 2001 discloses a crossing control arm assembly that is attached to the front of a school bus bumper. The crossing control arm assembly has an actuator and a crossing arm that is pivotally attached to the actuator. The crossing arm is stored adjacent the front of the bumper and pivoted outward by the actuator to a deployed position generally perpendicular to the bumper when the school bus stops to pick-up or discharge children. The deployed crossing arm prevents children from walking directly in front of the bus where the bus driver does not have a clear view.

In the past, school busses were largely designed with "add-on" bumpers that were attached to the chassis by brackets so as to stick out in front of the school bus body to protect the school bus body in a front end collision.

School busses are now being designed with styling in mind resulting in more aerodynamic looking bus bodies with styled front bumpers that are closer to the school bus body and shaped to blend into the school bus body. Styled front bumpers are more curved and contoured making it difficult to shape the crossing arm for storage adjacent the front of the bumper and an adequate projection in the deployed position.

SUMMARY OF THE INVENTION

This invention provides a crossing control arm assembly that has a crossing arm that can be combined with standard as well as styled bumpers that are curved and contoured; that is easily stored and that has an adequate projection when deployed.

The crossing arm is preferably stored adjacent the top of the bumper which results in considerable design freedom with respect to choosing curves and contours for the front bumper and the front end of the bus. Alternatively, the crossing arm may be stored adjacent the bottom of the bumper but this position is less desirable.

The crossing arm is also preferably stored behind the front surface of the bumper and deployed by an actuator that is located behind the front bumper for protection of the crossing arm and the actuator.

The crossing arm is connected to the actuator by a hinge arrangement that does not require any holes or slots that extend through the bumper to deploy the crossing arm when the actuator is located behind the bumper or any modification to the bumper face to store the crossing arm.

The crossing arm is preferably connected to the actuator assembly by a U-shaped hinge bracket that is pivotally attached to the actuator assembly at each end for distributing the loads transferred from the crossing arm to the actuator assembly.

The preferred hinge bracket includes a cross-over link for attaching the crossing arm that may be set at an angle with respect to the parallel legs of the U-shaped bracket to accommodate the contour of the bumper.

BRIEF DESCRIPTION OF THE DRAWINGS

FIG. 2 is an enlarged front perspective view of the bumper and crossing control arm assembly of FIG. 1 showing the crossing arm in a stored position atop the bumper;

FIG. 3 is a top view of the crossing arm stored atop the bumper;

FIG. 5 is a view similar to FIG. 2 showing the crossing arm of the crossing control arm assembly in a deployed position;

FIG. 6 is a section taken substantially along the line 6—6 of FIG. 5 looking in the direction of the arrows;

FIG. 7 is a front perspective view of the actuator of the crossing control arm assembly that is shown in FIG. 1;

FIG. 9 is a top view of an alternate crossing arm stored atop the bumper;

FIG. 10 is a section taken substantially along the line 10—10 of FIG. 9 looking in the direction of the arrows; and FIG. 11 is a rear perspective view of an alternate hinge bracket.

DETAILED DESCRIPTION OF PREFERRED EMBODIMENTS

Figure 1:
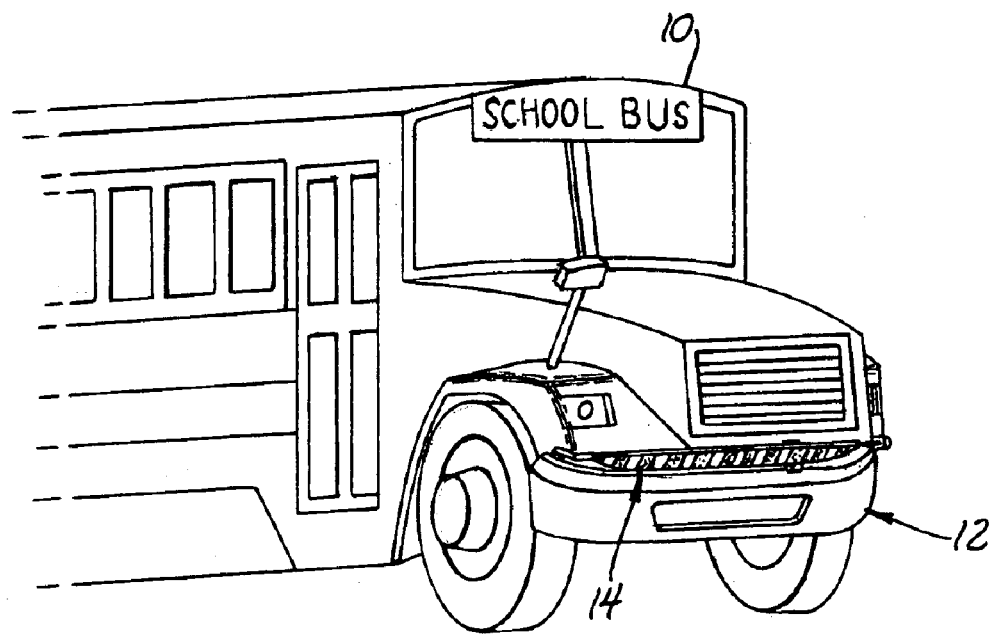
FIG. 1 is a front perspective view of a bus equipped with a crossing control arm assembly of the invention.

Referring now to the drawings, FIG. 1 shows a bus 10 having a styled front bumper 12 that carries a crossing control arm assembly 14 of the invention. The styled front bumper 12 has a generally straight midsection 16 and curved ends 18 as best shown in FIGS. 2 and 3. Crossing control arm assembly 14 comprises a multi-piece crossing arm 20 that is pivotally attached to an actuator 22.

Figure 8:
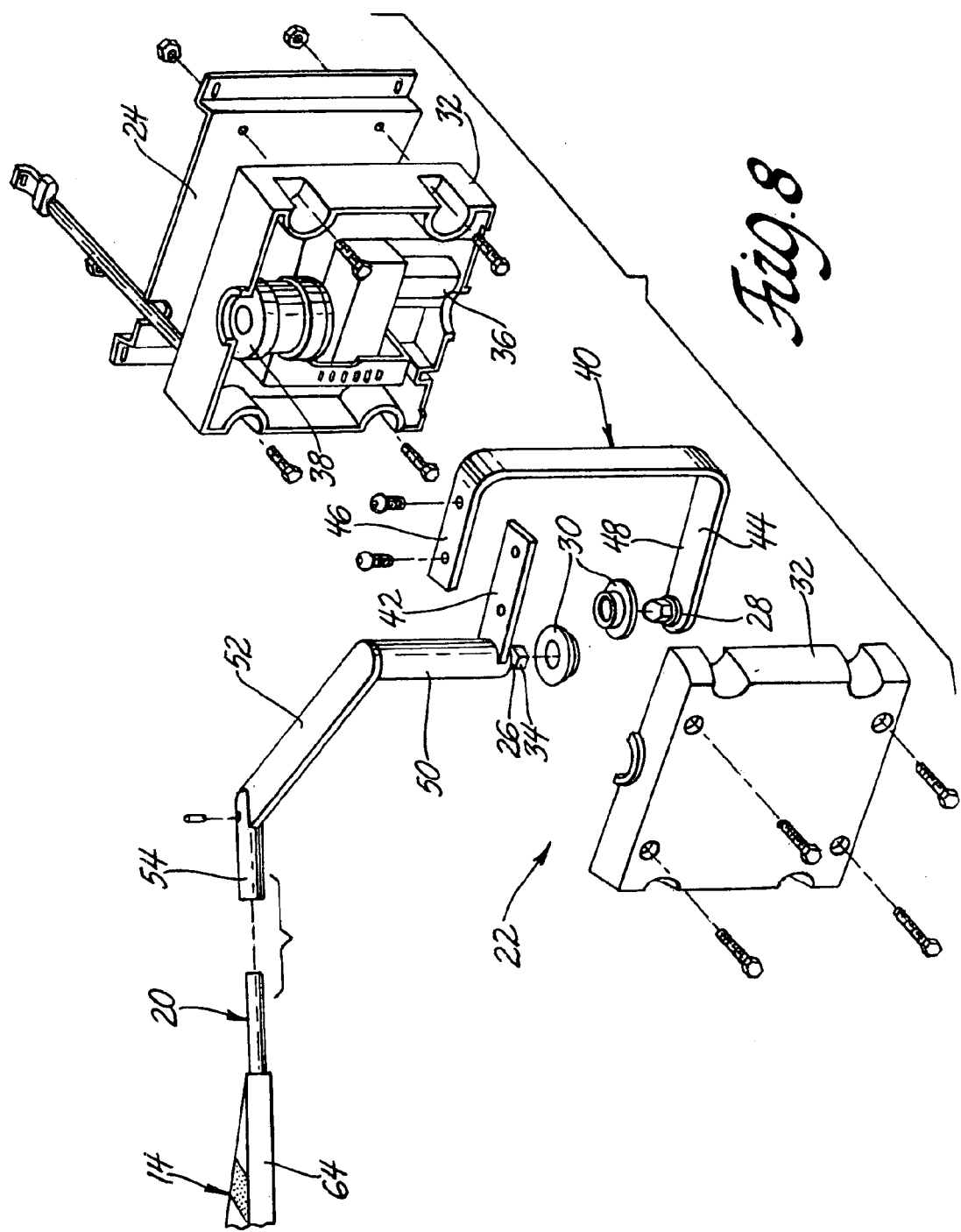
FIG. 8 is an exploded rear perspective view of the actuator that is shown in FIG. 7.

Actuator 22 is located behind bumper 12 and attached to a sheet metal bracket 24 by nuts and bolts as best shown in FIGS. 3, 7 and 8. Bracket 24 in turn is attached to the back of bumper 12 by fasteners 25, such as nuts and bolts with the bolts extending through holes in the bumper 12 as best shown in FIGS. 2 and 3.

Referring now to FIG. 8 which is an exploded rear perspective view of actuator 22, round upper and lower pivot members 26 and 28 extend through brass journals 30 in the top and bottom walls of a two-piece actuator housing 32. Pivot members 26 and 28 project into housing 32. At least one pivot member, preferably the upper pivot member 26 has a hexagonal or other irregular inner end 34 that is driven by a motor 36 connected to a mating socket 38 that receives the irregular inner end 34 of the pivot member 26 inside the actuator housing 32.

Pivot members 26 and 28 are part of a U-shaped hinge bracket 40 comprising, metal straps 42 and 44. Metal strap 44 is bent to shape to provide flat, upper and lower legs 46 and 48 that are spaced apart and parallel. Upper leg 26 is attached to the upper metal strap 42 and the lower leg 48 is attached to lower pivot member 28. Upper metal strap 42 is attached to a generally L-shaped extension comprising a rod 50 and a flat cross-over link 52. Rod 50 has a lower end attached to upper pivot member 26 coaxially and an upper end that is attached to an end of cross-over link 52. Crossover link 52 extends over the top of the bumper 12 in a cantilever fashion and has a ferrule 54 at a free or distal end for attaching the multi-piece crossing arm 20. Cross-over link 52 is set at a suitable angle with respect to the spaced parallel legs 46 and 48 of hinge bracket 40 to accommodate the contour of the bumper 12.

The multi-piece crossing arm 20 is stored in a position that is adjacent the top of the bumper 12 and behind a front surface 56 of the bumper 12 as best shown in FIG. 3. Actuator 22 moves the multi-piece crossing arm 20 via hinge bracket 40 from the stored position of FIGS. 1, 2 and 3 to a deployed position shown in FIGS. 5 and 6. When deployed, the multi-piece crossing arm 20 extends generally perpendicular to an imaginary front plane of the bumper 12 defined at least in part by the front surface 56 of the straight mid section 17. The length of the multi-piece crossing arm 20 is such that the tip 30 is usually about 60 to 62 inches from the front plane of the bumper 12 in the deployed position.

Actuator 22 may be any type of actuator that can move the crossing arm 20 back and forth between the stored and deployed positions. The actuator may be electric or fluid, including pneumatic. A suitable actuator having an electric motor is disclosed in U.S. Pat. No. 5,719,553 granted to Ronald C. Lamparter Feb. 17, 1988. Another suitable actuator having a pneumatic motor is disclosed in U.S. Pat. No. 6,435,075 granted to Ronald C. Lamparter et al. Aug. 20, 2002.

Figure 4:
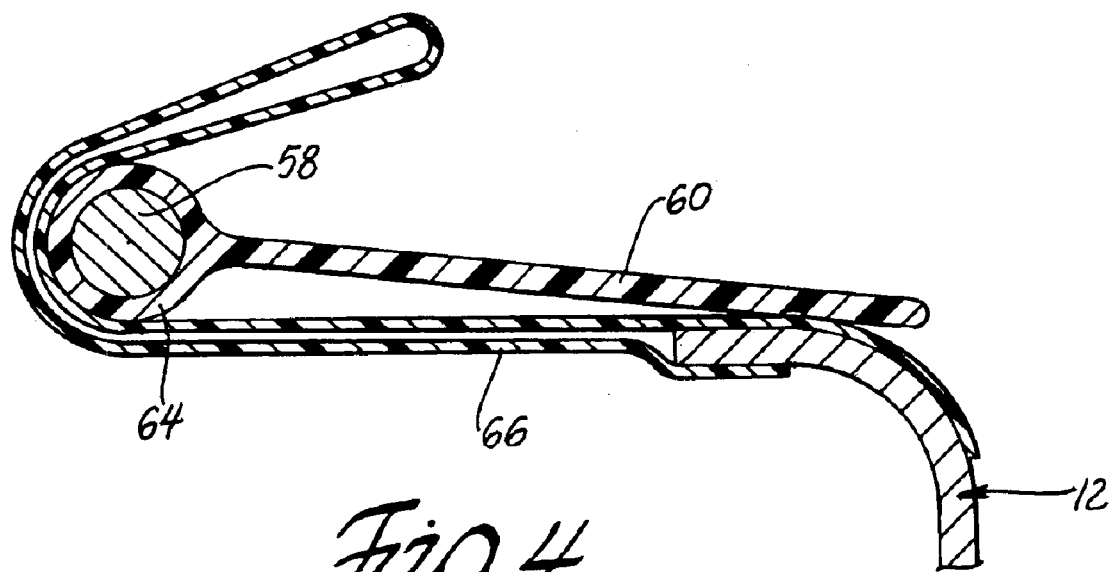
FIG. 4 is a section taken substantially along the line 4—4 of FIG. 2 looking in the direction of the arrows.
Figure 4A:
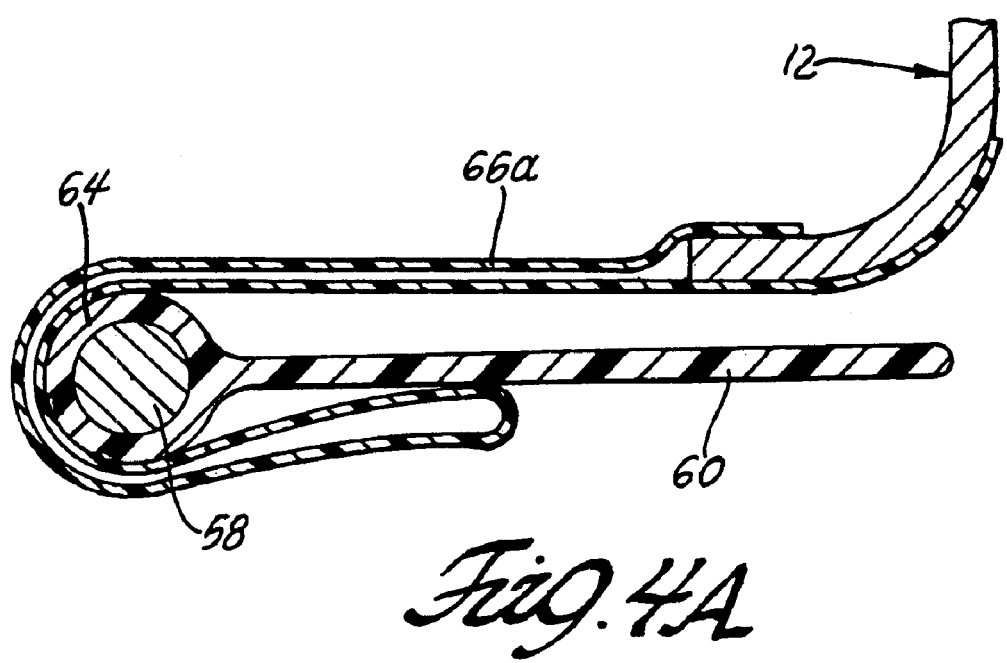
FIG. 4A is a section similar to FIG. 4 of an alternate embodiment.

The multi-piece crossing arm 20 includes a member 58 that is preferably a straight round rod and a flap 60 as shown in FIGS. 3 and 4. Flap 60 is preferably colored for high visibility, for example by alternate diagonal black and yellow stripes. An optional end member 62 may be attached to the end of rod 58 as shown in FIG. 9. End member 62 may be straight or curved depending upon the shape desired in connection with the contour of the bumper 12. The end member 62 is also preferably a rod.

Rod 58 is preferably straight and as long as possible taking the curvature of the front bumper 12 into account. The flap 60 includes an integral tube 64 at the rear edge that is pivotally mounted on rod 58. When crossing arm 20 is in the stored position shown in FIGS. 1, 2 and 3, tube 60 preferably fits into one or more clips holders 66 that are attached to the top of bumper 12 as shown in FIG. 4. The flap 60 may include an optional integral bead 65 at the front edge to reduce flutter of the flap 60 when the crossing arm 20 is in the stored position.

Flap 60 is stored in a generally horizontal position over bumper 12 as shown in FIGS. 1, 2, 3 and 4 and swings down into a generally vertical position when crossing arm 20 is deployed as shown in FIGS. 5 and 6.

As indicated above, end member 62 is optional. It may be necessary to include the end member 62 in order to achieve the desired extension in the deployed position, which is usually about 60 to 62 inches. However, in some instances, it may be possible to achieve such an extension with a straight rod 58 or a rod that has an integral curved end. It other instances, the extension achieved by the straight rod 58 may be sufficient in which case the optional end member 62 is not necessary.

An alternate hinge bracket 140 is shown in FIG. 11. Hinge bracket 140 has only one metal strap 142 that is bent to shape to provide not only the spaced, parallel upper and lower legs 146 and 148 but also the cross-over link 152, which in the alternate hinge bracket 140 is an integral coplanar extension of upper leg 146. Lower leg 148 is still attached to the lower pivot member 28 as is the case of hinge bracket 40. However, the upper leg 146 is now attached to the top of the extension rod 50 that is attached to the upper pivot member 26. The cantilevered cross-over link 152 is still set at an angle with respect to legs 146 and 148 to accommodate the contour of bumper 12 and cross-over link 152 still has a ferrule 154 at the free or distal end to attach crossing arm 20.

While it is preferable to store the multi-piece crossing arm 20 above the bumper, it is also possible to store the multi-piece crossing arm 20 below the bumper. However, the environment below the bumper is much harsher than the environment above the bumper and consequently, it is preferable to store the crossing arm above the bumper.

When the multi-piece crossing arm 20 is stored below the bumper, it is preferable to provide one or more clip holders similar to clip holder 66 to store flap 60 in a substantially horizontal position beneath the bumper. Such clip holders should take any sag of the deployed crossing arm into account.

Also, while a single piece flap, such as flap 60 is preferred, a multi-piece flap such as disclosed in U.S. Pat. No. 6,234,105 granted to Ronald C. Lamparter May 22, 2001, may also be used.

In other words, the invention has been described in an illustrated manner and the terminology is intended to be words of description rather than of limitation. Obviously, many modifications and variations of the present invention in light of the above teachings may be made. It is, therefore, to be understood that, within the scope of the appended claims, the invention may be practice otherwise than as specifically described.

What is claimed is:

1. A crossing control arm assembly for a bumper having an actuator in a housing that is adapted for attachment behind or to a back surface of the bumper, the crossing control arm assembly comprising a crossing arm that is attached to an actuator by a hinge bracket that includes upper and lower pivot members that have portions that are above and below the housing of the actuator respectively, the crossing arm being attached to the hinge bracket so as to be storable above or below the bumper and being moveable by the actuator to a deployed position generally perpendicular to the bumper when the housing is attached to the bumper.

2. A crossing control arm assembly for a bumper that is adapted for attachment behind or to a back surface of the bumper, the crossing control arm assembly comprising a crossing arm that is attached to an actuator by a hinge bracket that includes upper and lower pivot members of the actuator, the crossing arm being attached to the hinge bracket so as to be storable above or below the bumper and being moveable by the actuator to a deployed position generally perpendicular to the bumper wherein the crossing arm comprises a rod that is attached to the hinge bracket and a flap that is pivotally attached to the rod so that the flap is stored in a substantially horizontal position and deployed in a substantially vertical position.

3. A crossing control arm assembly for a bumper that is adapted for attachment behind or to a back surface of the bumper, the crossing control arm assembly comprising a crossing arm that is attached to an actuator by a hinge bracket that includes upper and lower pivot members of the actuator that pivot about a pivot axis of the actuator, the crossing arm being attached to the hinge bracket so as to be storable above or below the bumper and being moveable by the actuator to a deployed position generally perpendicular to the bumper wherein the hinge bracket is U-shaped with substantially parallel, axially spaced legs attached to the upper and lower pivot members, respectively and the crossing arm is attached to a cross-over link that is attached to one of the legs of the bracket in cantilever fashion so as to orient the crossing arm tangentially with respect to the pivot axis.

4. The crossing arm assembly as defined in claim 3 wherein the hinge bracket includes a generally L-shaped extension that includes a rod that pivots about the pivot axis of the actuator, and that supports the cross-over link in cantilever fashion.

5. The crossing arm assembly as defined in claim 3 wherein the cross-over link is an integral coplanar extension of one of the spaced legs of the bracket.

6. The crossing arm assembly as defined in claim 3 in combination with a bumper wherein the actuator is located behind the bumper.

7. The crossing arm assembly as defined in claim 6 wherein the crossing arm comprises a rod, the cross-over link extends over the top of the bumper, and the cross-over link is attached to an end of the rod of the crossing arm.

8. The crossing arm assembly as defined in claim 7 wherein the cross-over link is at an angle with respect to the upper leg of the hinge bracket.

9. The crossing arm assembly as defined in claim 7 wherein the crossing arm is stored in a position above the bumper and behind a front surface of the bumper and moved to a deployed position where the crossing arm extends generally perpendicular to an imaginary front plane of the bumper defined in part by the front surface of the bumper.

10. The crossing arm assembly as defined in claim 9 wherein the crossing arm has a tip that is about 60 to 62 inches from the imaginary front plane in the deployed position.

11. The crossing arm assembly as defined in claim 10 wherein the crossing arm includes a straight round rod and a flap that is stored adjacent a top surface of the bumper in a generally horizontal position and that swings down to a generally vertical position when the crossing arm is deployed.

12. The crossing arm assembly as defined in claim 11 wherein the crossing arm includes an end member that is attached to an end of the rod member, the end member being straight or curved.

13. The crossing arm assembly as defined in claim 11 wherein the flap member includes an integral tube at the rear edge that is pivotally mounted on the rod.

14. The crossing arm assembly as defined in claim 13 wherein the tube is disposed in a clip holder attached to the bumper when the crossing arm assembly is in the stored position.

15. The combination of a bus having a front bumper and a crossing control arm assembly comprising an actuator and a crossing arm, the actuator being located behind the bumper and the crossing arm being attached to the actuator by a hinge bracket that includes upper and lower pivot members of the actuator, the crossing arm being attached to the hinge bracket so as to be stored above the bumper and including a rod that is attached to the hinge bracket and moveable by the actuator in a substantially horizontal direction to a deployed position generally perpendicular to the bumper.

16. The combination as defined in claim 15 wherein the crossing arm further comprises a flap that is pivotally attached to the rod so that the flap is stored in a substantially horizontal position and deployed in a substantially vertical position.

17. The combination of a bus having a front bumper and a crossing control arm assembly comprising an actuator and a crossing arm, the actuator being located in a housing behind the bumper and the crossing arm being attached to the actuator by a hinge bracket that includes upper and lower pivot members above and below the housing of the actuator respectively, the crossing arm comprising a rod that is attached to the hinge bracket so as to be stored above the bumper and moveable by the actuator in a substantially horizontal direction to a deployed position generally perpendicular to the bumper, the hinge bracket being U-shaped with substantially parallel, axially spaced legs attached to the upper and lower pivot members, respectively and the crossing arm being attached to a cross-over link that is attached to one of the legs in cantilever fashion and that extends over the top of the bumper, the cross over link being attached to an end of the rod of the crossing arm.

18. The combination as defined in claim 17 wherein the hinge bracket includes a generally L-shaped extension that includes a rod that pivots about an axis of the actuator, and that supports the cross-over link in cantilever fashion.

19. The combination as defined in claim 18 wherein the cross-over link is at an angle with respect to the upper leg of the hinge bracket.

20. The combination as defined in claim 19 wherein the crossing arm is stored behind a front surface of the bumper and moved to a deployed position where the crossing arm extends generally perpendicular to an imaginary front plane of the bumper defined in part by the front surface of the bumper.

21. The combination as defined in claim 20 wherein the crossing arm includes a straight round rod and a flap that is stored adjacent a top surface of the bumper in a generally horizontal position and that swings down to a generally vertical position when the crossing arm is deployed.

22. The combination as defined in claim 21 wherein the flap includes an integral tube at the rear edge that is pivotally mounted on the rod.

23. The combination as defined in claim 22 wherein the tube is disposed in a clip holder attached to the bumper when the flap is in the stored position.

24. The combination as defined in claim 17 wherein the cross-over link is an integral coplanar extension of one of the spaced legs.

25. The combination as defined in claim 17 further comprising a flap that is pivotally attached to the rod so that the flap is stored in a substantially horizontal position and deployed in a substantially vertical position.

26. The combination as defined in claim 24 wherein the cross-over link is at an angle with respect to the upper leg of the hinge bracket.

27. The combination as defined in claim 26 wherein the crossing arm is stored behind a front surface of the bumper and moved to a deployed position where the crossing arm extends generally perpendicular to an imaginary front plane of the bumper defined in part by the front surface of the bumper.

28. The combination as defined in claim 27 wherein the crossing arm includes a straight round rod and a flap that is stored adjacent a top surface of the bumper in a generally horizontal position and that swings down to a generally vertical position when the crossing arm is deployed.

29. The combination as defined in claim 28 wherein the flap includes an integral tube at the rear edge that is pivotally mounted on the rod.

30. The combination as defined in claim 29 wherein the tube is disposed in a clip holder attached to the bumper when the flap is in the stored position.

31. A crossing control arm assembly for a bumper that is adapted for attachment behind or to a back surface of the bumper and having a crossing arm than can be stored above the bumper when the crossing control arm assembly is attached behind or to a back surface of the bumper, the crossing control arm assembly comprising:

an actuator in a housing, a crossing arm that is attached to the actuator by an external hinge bracket that includes upper and lower pivot members that are above and below the housing of the actuator respectively and that pivot about a pivot axis of the actuator, the hinge bracket being U-shaped with substantially parallel, axially spaced legs that are attached to the upper and lower pivot members, respectively, and that extend in a first radial direction away from the pivot axis, a cross-over link that is attached to one of the legs of the bracket in cantilever fashion and that extends away from the pivot axis is a second radial direction, and the crossing arm being attached to the cross-over link at a location spaced from the pivot axis and so as to orient the crossing arm tangentially with respect to the pivot axis.

32. The crossing arm assembly as defined in claim 31 wherein the crossing arm comprises a rod, the cross-over link is attached to an end of the rod of the crossing arm, and the cross-over link is at an angle with respect to the one of the legs of the hinge bracket.

33. The crossing arm assembly as defined in claim 32 wherein the hinge bracket includes a generally L-shaped extension that includes a rod that pivots about the pivot axis of the actuator, and that supports the cross-over link in cantilever fashion.

34. The crossing arm assembly as defined in claim 32 wherein the cross-over link is an integral coplanar extension of the one of the legs of the hinge bracket.

* * * * *